United States Patent [19]

Denny

[11] Patent Number: 4,950,010

[45] Date of Patent: Aug. 21, 1990

[54] VEHICLE FRAME-MOUNTABLE ACCESSORY RECEIVER APPARATUS AND METHOD FOR MANUFACTURE

[76] Inventor: Gerald L. Denny, 3132 SE. 28th St., Portland, Oreg. 97202

[21] Appl. No.: 367,626

[22] Filed: Jun. 19, 1989

[51] Int. Cl.⁵ .............................................. B60R 19/48
[52] U.S. Cl. .............................. 293/117; 224/42.03 R; 280/460.1
[58] Field of Search ............................. 293/106, 117; 224/42.03 R; 280/460.1, 500, 505

[56] References Cited

U.S. PATENT DOCUMENTS

| | | | |
|---|---|---|---|
| 2,958,543 | 11/1960 | Cooper et al. | 280/491.3 |
| 3,682,360 | 8/1972 | Fletcher et al. | 224/42.05 |
| 3,717,362 | 2/1973 | Johnson | 280/500 X |
| 3,785,541 | 1/1974 | Sibley | 224/42.08 |
| 3,794,227 | 2/1974 | Stearns | 224/42.01 |
| 4,046,398 | 9/1977 | Dunwoody | 280/415.1 |
| 4,050,714 | 9/1977 | Epp | 280/495 |
| 4,099,760 | 7/1978 | Mascotte et al. | 224/42.08 X |
| 4,138,152 | 2/1979 | Prue | 293/117 |
| 4,159,833 | 7/1979 | Meiners | 293/117 X |
| 4,204,701 | 5/1980 | Oltrogge | 280/500 X |
| 4,204,702 | 5/1980 | Oltrogge | 280/500 X |
| 4,239,253 | 12/1980 | Golze | 293/117 X |
| 4,405,141 | 9/1983 | Jurek | 293/117 X |
| 4,487,446 | 12/1984 | Reich, II | 293/117 X |
| 4,610,458 | 9/1986 | Garnham | 280/495 |
| 4,646,952 | 3/1987 | Timmers | 224/42.07 |
| 4,738,464 | 4/1988 | Putnam | 280/505 X |

Primary Examiner—Dennis H. Pedder
Attorney, Agent, or Firm—Kolisch, Hartwell & Dickinson

[57] ABSTRACT

Receiver apparatus for mounting accessories to the frame of a vehicle, and a method of manufacture of the same, are disclosed. In one embodiment, a bumper/receiver is integrally formed, with the bumper being formed of heavy gauge steel and being substantially hollow in the region bounded by its steel walls. Dual, laterally spaced, elongate, square cross-sectional receivers extend from a first outer expanse through the hollow region substantially beyond a second outer expanse of the bumper, forming elongate channels dimensioned to receive correspondingly spaced elongate mounting projections ("stingers") of a vehicular accessory. In the preferred embodiment, a third elongate receiver having a long axis parallel with the long axes of the spaced pair of receivers also is formed in the bumper, its axes being below the plane formed by the axes of the receiver pair. Each receiver is provided with means for lockably securing a stinger therein. In a modification, three laterally spaced receivers are rigidly joined to a crossmember having vehicle frame-mountable support brackets. The preferred method of manufacture of the bumper/receiver apparatus includes the use of a special jig to maintain the parallel alignment of plural receivers/stickers during their welded joinder to the bumper/crossmember. Finally, dual stinger accessories are described that interchangeably may be mounted within the receiver apparatus.

3 Claims, 4 Drawing Sheets

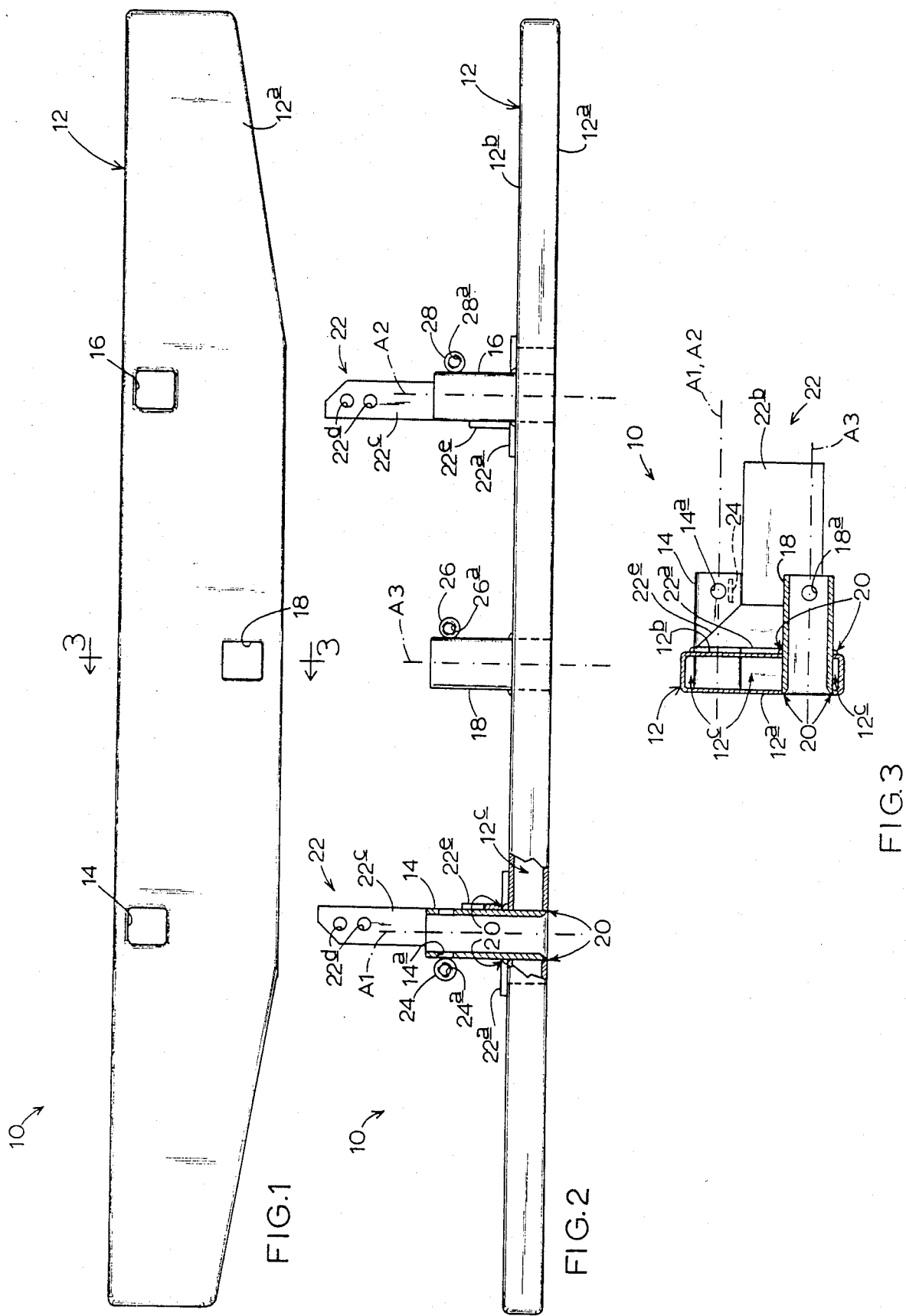

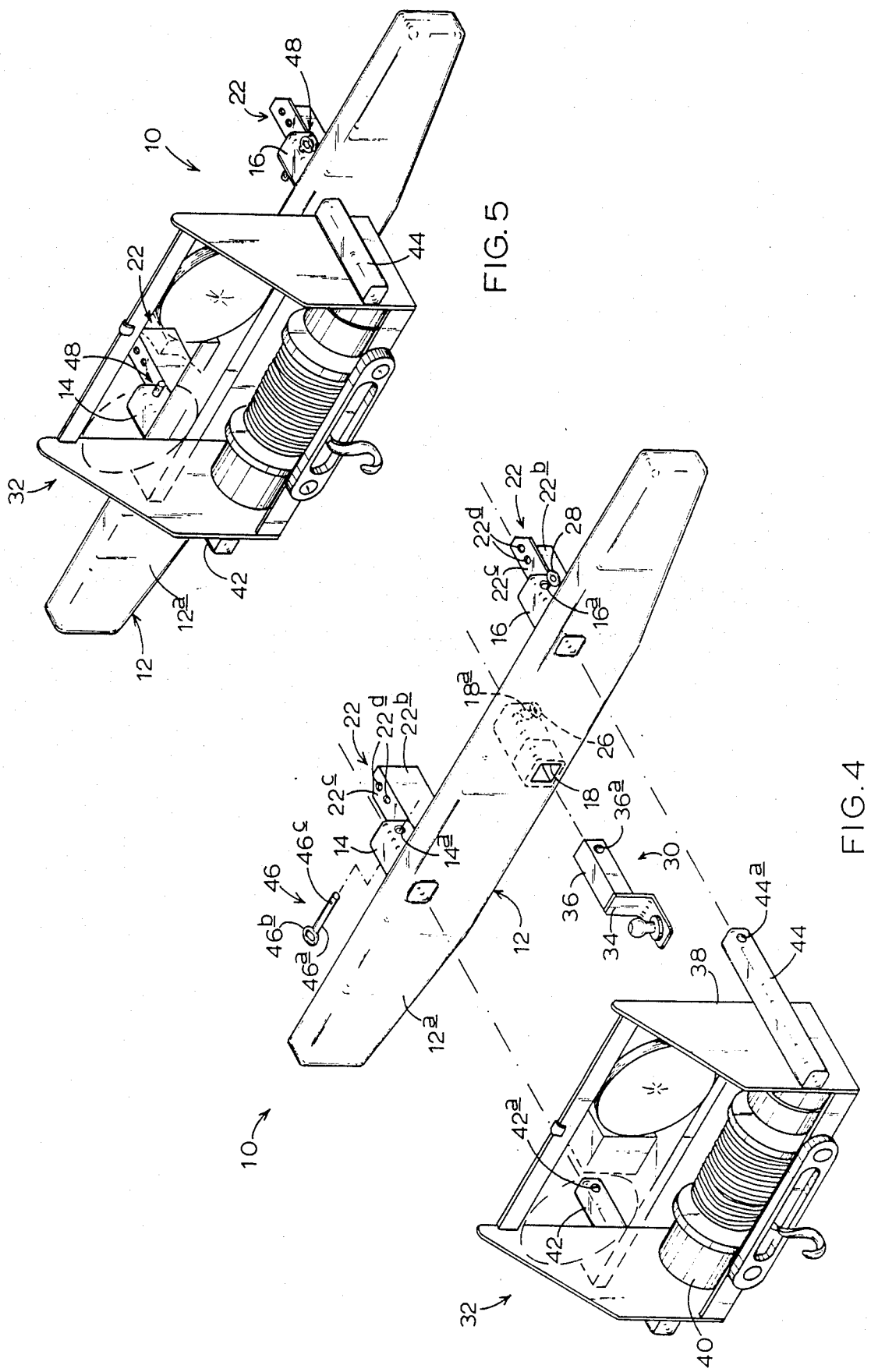

VEHICLE FRAME-MOUNTABLE ACCESSORY RECEIVER APPARATUS AND METHOD FOR MANUFACTURE

BACKGROUND AND SUMMARY OF THE INVENTION

This invention relates generally to vehicle frame-mountable accessory receiver apparatus. More specifically, it concerns receiver apparatus adapted detachably, securably to mount a wide range of vehicular accessories interchangeably to the front or rear of a vehicle and a method for its manufacture.

Apparatus for mounting accessories to vehicles are well-known. One such apparatus consists of a single elongate tubular receiver dimensioned in cross section to receive therein an elongate mounting projection, or so-called "stinger", of a vehicular accessory, e.g. a 'drop' hitch. Such apparatus typically are adapted for mounting to the bumper, or to the frame and adjacent the bumper, of a vehicle by conventional hardware fasteners, e.g. rivets or bolts and nuts. Attempts to integrate the bumper and accessory receiver functions in a single, inseparable structure capable of being mounted on a vehicle's frame and capable of receiving a wide range of accessories have been proposed, but none has proven practical in respect of load-bearing capacity, simplicity of design and facility of use.

Moreover, prior art apparatus are extremely limited in their ability to bear and stabilize substantial loads because they have only one receiver. The provision of more than one receiver, for receiving corresponding stingers of an accessory, would greatly enhance the utility of tubular receiver systems. The tongue and gross capacity of a receiver system having dual, laterally spaced receivers would be double that of a single receiver system. More importantly, a dual receiver system would profoundly diminish the normal tendency of a heavy accessory, e.g. a laden trailer, to undergo lateral and rotational movement analogous to the yaw and roll of an airplane or spacecraft. Yet the production of plural receiver systems is fraught with difficulty, due to the extremely tight dimensional and angular tolerances required for the tight fitting, but universally interchangeable, mounting of vehicular accessories. This difficulty heretofore has not been acknowledged, or, if acknowledged, has not been addressed realistically. Resort to lightweight accessories that can be made by flexing to mate laterally spaced receiver pairs compromises the potentially increased capacity of a plural receiver system and thus is self-defeating. Resort to deliberately and grossly over-sized, dual receivers capable of accommodating a durable accessory inadequately secures the accessory and subjects it to undue vibration and wear.

Accordingly, it is a principal object of the invention to provide integral bumper/receiver apparatus that readily can be mounted to the front or rear frame of a vehicle and that readily and securely can receive therein a wide range of vehicular accessories.

A further object is to provide bumper/receiver apparatus that are durable and capable of bearing substantial vertical and horizontal loads.

Yet another object is to provide such apparatus with means for the easily detachable, lockable securing of an accessory thereto.

It is another object to provide such apparatus, for frame mounting to a vehicle, having no projections outwardly from the vehicle beyond the surface of the bumper.

Still another object is to provide such apparatus with an aesthetically pleasing appearance, so as to enhance, rather than detract from, the appearance of the vehicle to which it is mounted.

Another object of the invention is to provide such apparatus in easily manufactured form, having a minimal number of separable parts and attendant fastener hardware.

Yet another object of the invention is to provide such apparatus cost-effectively.

These and other objects and advantages of the present invention will be more clearly understood from a consideration of the accompanying drawings and description of the preferred embodiment.

BRIEF DESCRIPTION OF THE DRAWINGS

FIG. 1 is a front elevation of the bumper/receiver apparatus of the invention made in accordance with its preferred embodiment.

FIG. 2 is a top view of the apparatus corresponding to FIG. 1.

FIG. 3 is a cross-sectional side view taken generally along the lines 3—3 of FIG. 1, showing the internal structure of the receivers extending through the hollow bumper.

FIG. 4 is an isometric view of the apparatus in its preferred embodiment, showing accessories that can be received therein.

FIG. 5 is an isometric view of the apparatus corresponding to FIG. 4, but showing an accessory securely received therein.

DETAILED DESCRIPTION OF THE PREFERRED EMBODIMENT

Figure 6A:
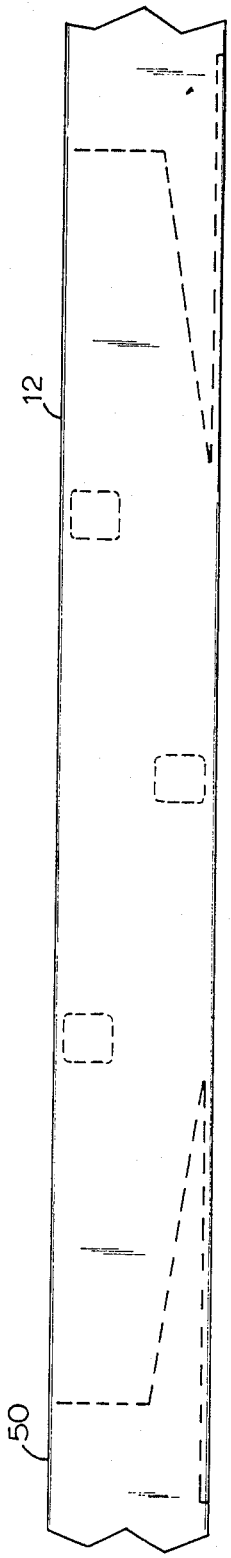
FIGS. 6A through 6D comprise a sequence of front elevations of the apparatus corresponding to FIG. 1, and shows various steps in the preferred method of its manufacture.

Referring collectively to FIGS. 1 through 3, a vehicle frame-mountable bumper/receiver apparatus, made in accordance with the preferred embodiment of the invention, is shown at 10. Bumper/receiver apparatus 10 comprises a bumper 12 having spaced first and second generally parallel, planar expanses 12a, 12b partly bounding a void region 12c therebetween; three spaced, elongate receivers 14, 16, 18 each of which forms an elongate channel cross-sectionally dimensioned to receive therein an elongate mounting projection of an accessory, with the channel having an open end in the plane of first bumper expanse 12a. Apparatus 10 further comprises joinder means, e.g. weld joints indicated generally at 20 in FIGS. 2 and 3, rigidly joining receivers 14, 16, 18 to bumper 12 in corresponding spaced joinder regions of bumper expanses 12a, 12b, and mounting means 22 mounting bumper 12 to the frame of a vehicle.

Bumper 12 is preferably a hollow and of a predetermined thickness, e.g. approximately two inches in the preferred embodiment. In the preferred embodiment of apparatus 10 bumper 12 has rigid, 0.187" thick (U S. Standard Gage No. 7) steel walls (including expanses 12a, 12b) enclosing a space that is hollow but for receivers 14, 16, 18. In the preferred embodiment, bumper 12 is formed of rectangular tubular stock available in a range of sizes from 2"×6", 2"×8", 2"×10" and 2"×12", and its overall finished length ranges from approximately 57 to 100 inches. The vertical and horizontal dimensions (height and length) of bumper 12 are dependent upon the size of the vehicle for which it is made, e.g. from relatively narrow-bodied jeeps to relatively wide-bodied mobile homes.

In the preferred embodiment, receivers 14, 16, 18 are made from two inch (inside) square cross section, so-called "telescopic" seamless tubing, which is formed of 0.250" thick (U.S. Standard Gage No. 3) steel, and have a lengthwise dimension—six inches in the preferred embodiment—that is substantially greater than the thickness of bumper 12. Each of receivers 14, 16, 18 has a pair of 0.625" diameter holes, such as hole pairs 14a, 16a, 18a, formed in precise lateral alignment in their lateral side walls, with their centers approximately one inch from the free ends thereof. Receivers 14, 16, 18 also have locking rings 24, 26, 28 rigidly joined to their side walls immediately below one hole of each pair of holes, such as hole pairs 14a, 16a, 18a, with the locking rings forming through holes 24a, 26a, 28a for lockably securing an accessory within the receivers (as will be described in reference to FIGS. 4 and 5).

Each of the two "mirror image", laterally spaced brackets of mounting means 22 comprises three orthogonal planar expanses 22a, 22b, 22c preferably made of 250" thick (U.S. Standard Gage No. 3) steel. Expanse 22a is, in accordance with the preferred embodiment of the invention, rigidly joined, e.g. welded, to second expanse 12b of bumper 12; expanse 22b extends inwardly (toward the vehicle) from expanse 22a and at a right angle thereto; expanse 22c extends at a right angle from expanse 22b and has formed therein plural holes 22d to accommodate mounting hardware for mounting the bracket to the frame of a vehicle. Finally, in the preferred embodiment, a steel plate 22e is welded to both the receivers and their corresponding brackets further to rigidize bumper/receiver apparatus 10.

It will be appreciated that the brackets are illustrative of one embodiment of mounting means 22, and that its precise form and extent depends upon the particular make and model of vehicle to which bumper/receiver apparatus 10 is to be mounted. Within the spirit of the invention, mounting means 22 can assume any one of a variety of specific embodiments that provides the required rigidity and durability. It will also be appreciated that, within the spirit of the invention, mounting means 22 may be welded, rather than fastened, to the frame of a vehicle. Because bumper/receiver apparatus 10 is designed to replace the stock bumper of a vehicle, and to be permanently mounted to the frame of the vehicle, welding the brackets of mounting means 22 to the frame of the vehicle would provide trouble-free, lasting security.

Importantly, receivers 14, 16, 18 are aligned, with their longitudinal, central axes A1, A2, A3 (shown in dash-dot lines in FIGS. 2 and 3) substantially parallel with one another and substantially normal to the plane of first bumper expanse 12a. Receivers 14, 16 form a pair of laterally spaced receivers axes A1, A2 of which may be seen to define a generally horizontal plane for mounting a dual, laterally spaced stinger-equipped vehicular accessory, e.g. a grill guard. In the preferred embodiment, receivers 14, 16 are spaced 26.536" center-to-center. Axis A3 of receiver 18 may be seen to be located below the plane defined by axes A1, A2, and may be used to mount single stinger-equipped vehicular accessories, e.g. drop hitches Receivers 14, 16, 18 each may be seen to be flush-mounted to, and to extend inwardly (relative to the vehicle to which apparatus 10 is mounted) from, first bumper expanse 12a and to form a channel extending therefrom to an opposite terminal edge at the free end of each receiver. It will be appreciated that any number of paired, laterally spaced receivers, and any number of single receivers located below a plane in which such pairs lie, may, within the spirit of the invention, be provided integral with bumper 12.

It is believed that the unique, hollow construction of bumper 12 and the rigid welded joinder thereto, at first and second spaced expanses thereof, of elongate receivers that extend therebetween and substantially beyond the second expanse provide unprecedented strength and durability in bumper/receiver apparatus. Bumper/receiver apparatus made in accordance with the preferred embodiment illustrated in FIGS. 1 through 3 and described above have a rated capacity of one thousand pounds tongue weight and ten thousand pounds gross weight. Thus, virtually any accessory—whether of the single or double stinger type—is accommodated by the apparatus, and when properly installed, as will be described in reference to FIGS. 4 and 5, is extremely stable and secure.

Turning now to FIG. 4, bumper/receiver apparatus 10 and two exemplary vehicular accessories that it is adapted to mount—a 'drop' hitch accessory 30 and a grill guard/winch 32—are shown in an isometric, exploded view. 'Drop' hitch accessory 30 has a conventional ball hitch 34 and a single stinger 36 dimensioned snugly to fit within receiver 18 of bumper/receiver apparatus 10. Tubular stinger 36 is of two inch (outside) square cross section, and is dimensioned lengthwise to extend substantially, when installed in bumper/receiver apparatus 10, to the depth of receiver 18, or approximately six inches in the preferred embodiment. Stinger 36 has a pair of laterally spaced through holes 36a located approximately 2¾ from its free end, the holes being alignable, when hitch accessory 30 is slidingly received within receiver 18, with corresponding hole pair 18a. For the purpose of accommodating certain accessories, e.g. weight distribution hitches, whose stingers are made of steel bar stock (which in cross section defines a square having sharp corners rather than the round-cornered, tubular cross section illustrated in FIG. 4), the four slightly rounded corners of receiver 18 are swaged and thus sharpened in a manner that is well-known to those of skill in the art.

A dual stinger accessory, or grill guard/winch 32 includes carriage means, or a grill guard 38 for transporting an article, e.g. a winch assembly 40, external to, and under the power of, a vehicle to whose frame a receiver apparatus is mounted; and operatively connected thereto, dual laterally spaced elongate mounting projections, or stingers 42, 44 that are dimensioned snugly to fit within receivers 14, 16 of the receiver apparatus, e.g. bumper/receiver apparatus 10. Stingers 42, 44 have hole pairs 42a, 44a formed in precise lateral alignment in their lateral side walls to correspond precisely with the location of hole pairs 14a, 16a in receivers 14, 16. Stingers 42, 44 are spaced, at 26.536" centerto-center in accordance with the preferred embodiment of the invention, identically with the spacing of receivers 14, 16, and their longitudinal axes are in substantially parallel alignment with one another, thereby to ensure their secure fit within, and substantially to the lengthwise extent of, receivers 14, 16. Finally, stingers 42, 44 are rigidly joined, e.g. by welding, to grill guard 38 to produce a rigid, durable, vehicular accessory capable of bearing the load and stress incident to winching a substantial mass. It will be appreciated that carriage means 38 may take an alternative form, including a dual stinger-equipped box, tray, rack, lift, tow bar, utility trailer, mobile home, or other carrier of articles or the like.

Finally in reference to FIG. 4, a cinch pin 46 having a solid, cylindrical barrel 46a, a lock ring 46b rigidly mounted on one end and through hole 46c (dimensioned to receive therethrough a cotter pin or the like, not shown) bored adjacent the opposite end is shown. Cinch pin 46, of which only one is shown in FIG. 4 but of which two generally are preferred to mount a dual stinger accessory such as grill guard/winch 32, is dimensioned snugly to be received through aligned sets of hole pairs, e.g. hole pairs 14a, 42a, with lock ring 46b being alignable immediately above lock ring 24a of receiver 14 and with barrel 46a being dimensioned to extend beyond the width of receiver 14. It will be understood that alignable sets of hole pairs, e.g. hole pairs 14a, 42a cooperate with one or more cinch pins 46 (and, optionally, with one or more conventional padlocks securing together alignable lock rings, e.g. lock rings 24, 46b) to provide bumper/receiver apparatus 10 with securement means 48 associated with receivers 14, 16 and stingers 42, 44 for detachably, lockably securing an accessory to a bumper/receiver apparatus-equipped vehicle, wherein one or more elongate mounting projections, e.g. stinger 42, is detachably securable within one or more receivers 14, 16.

Turning now to FIG. 5, a grill guard/winch assembly 32 is shown securely mounted within bumper/receiver apparatus 10 with dual cinch pins 46 lockably secured through the aligned hole pairs of receivers 14, 16 and stingers 42, 44. Persons of skill will appreciate that, in order to achieve the desired goals of stability, durability and vibration-free accessory mounting, stingers 42, 44 must be dimensioned and aligned accurately to be received properly within receivers 14, 16. While it would be possible to oversize receivers 14, 16 more readily to receive stingers 42, 44, this is undesirable, as the resulting loose fit therebetween, despite their securement by cinch pins 46, would result in vibration and accelerated wear. Thus, extremely tight dimensional and angular tolerances must be maintained in terms of the internal cross-sectional dimensions of receivers 14, 16; the external cross-sectional dimensions of stingers 42, 44; the parallel alignment of the longitudinal axes of receiver pair 14, 16 and stinger pair 42, 44 and their fixed alignment (against rotation) relative thereto; and the normal orientation of the parallel axes to the plane of expanse 12a of bumper 12 and the plane defining an inner, vertical boundary of a vehicular accessory, e.g. grill guard/winch assembly 32. It will be appreciated that a virtually unlimited array of vehicular accessories may be accommodated by bumper/receiver apparatus 10, including spare tire, toolbox and cycle carriers; tow bars; and overhead racks, as well as the aforementioned 'drop' and weight distribution hitches and grill guard/winch.

Maintenance of these tight tolerances is even more important because, not only must a particular, dual stinger vehicular accessory properly fit within dual, laterally spaced receivers of a particular bumper/receiver apparatus, but also other dual stinger vehicular accessories made in accordance with the invention must interchangeably fit within the same laterally spaced receivers of a particular bumper/receiver apparatus. Moreover, a particular dual stinger vehicular accessory also interchangeably must fit within other bumper/receiver apparatus made in accordance with the invention. This reciprocal interchangability requirement is important to achieving the goal of universal adaptability of the bumper/receiver apparatus vis a vis the vehicular accessories.

Turning now to FIGS. 6A through 6D, the preferred method of manufacturing the apparatus of the invention in its preferred embodiment is shown in a series of illustrations corresponding generally to FIG. 1. FIG. 6A shows a fragmentary length of rectangular tubing 50 from which bumper/receiver apparatus 10 is made. Shown in dashed lines are the lines along which cuts are to be made in first and second planar expanses 12a, 12b (the latter of which is not shown in the front elevations of FIGS. 6A through 6D). The dashed lines to the left and right of FIG. 6A describe the preferred lines for cutting the rectangular tubing to form the lateral ends of bumper 12, with the 0.187" thick bottom wall of tubing 50 being lengthwise dimensioned to form the lateral end walls of bumper 12. The square dashed outlines of FIG. 6A represent the properly spaced and dimensioned cutouts to be made in first and second expanses 12a, 12b to receive the "telescopic" square tubing that forms receivers 14, 16, 18. In accordance with the preferred method of manufacturing bumper/receiver apparatus 10, these square cutouts are 2½" on a side, with slightly rounded corners. The cuts that are indicated by dashed lines in FIG. 6A are made by conventional means appropriate to the gauge of steel being cut, e.g. a cutting torch or plasma burner.

Figure 6B:
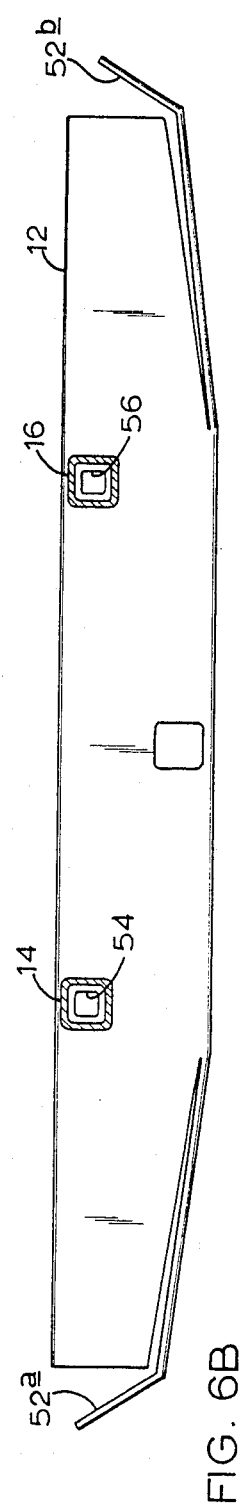

FIG. 6B illustrates a step in the manufacture of bumper/receiver apparatus 10 in which opposite, horizontal, planar extensions 52a, 52b of tubing 50 twice are bent to conform their free ends to the outline of bumper 12 and in which receivers 14, 16 are positioned within the square cutouts of bumper 12. Two laterally spaced male members 54, 56 are shown nested within receivers 14, 16. Persons skilled in the art will appreciate that male members 54, 56 form part of a jig that ensures the proper positioning and alignment of receivers 14, 16 relative to bumper 12 while they are being welded. It has been discovered that, to achieve the desired fit between a pair of stingers, e.g. stingers 42, 44 (refer to FIGS. 4 and 5) and a pair of receivers, e.g. receivers 14, 16, the maximum permissible dimensional deviation from parallel (the difference between the center-to-center spacing, as measured at extreme ends of receivers 14, 16) is approximately 1/64 inch. Therefore, it is difficult to achieve the required accuracy without using a properly calibrated jig in the manufacture of bumper/receiver apparatus 10. Those skilled in the art also will appreciate that such a jig may be equipped with a work surface to which bumper 12 may be clamped, thereby to immobilize receivers 14, 16 relative to bumper 12 in proper position and alignment for their welded joinder.

Figure 6C:
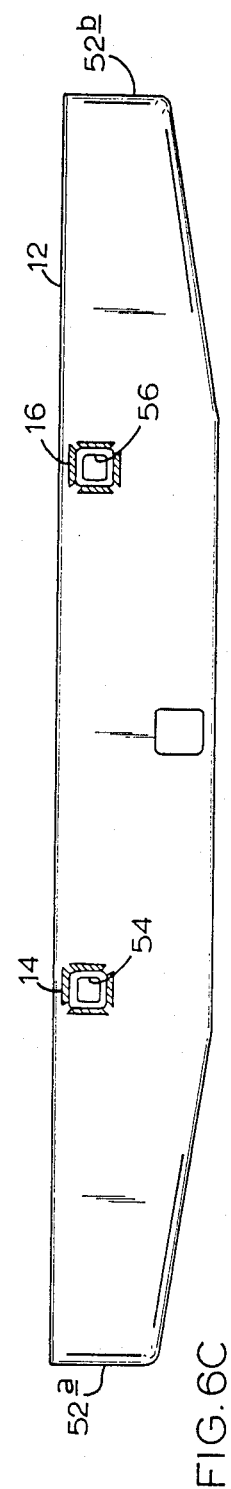

FIG. 6C shows a subsequent step in forming bumper/receiver apparatus 10 in accordance with the preferred method of its manufacture. In FIG. 6C, planar extensions 52a, 52b have been tack-welded into place along the inclined and vertical segments which make up the opposite, end regions of bumper 12. FIG. 6C also shows the process by which it has been discovered possible rigidly to join receivers 14, 16 to first and second expanses 12a, 12b of bumper 12 while maintaining their precise positioning relative thereto.

Importantly, receivers 14, 16 first are tack-welded, preferably at opposite corners of the rectangular interface between the outer perimeter of receivers 14, 16 and the inner perimeter of the square cutouts that were made in tubing 50. By alternately tacking receivers 14, 16 into place relative to both first and second expanses 12a, 12b of bumper 12, the tendency of receivers 14, 16 to rotate (crawl) or move due to material flow and/or shrinkage is minimized. Movement and rotation of receivers 14, 16 relative to bumper 12 is not always predictable or repeatable, and those skilled in the art will appreciate that it is dependant upon such difficult-to-control variables as ambient temperature and humidity. The goal is to secure receivers 14, 16 relative to first and second expanses 12a, 12b in proper position and orientation to achieve the tight tolerances that will permit universal adaptation by bumper/receiver apparatus 10 of any vehicular apparatus made in accordance with the invention. This often requires that compensatory, preferably perimetrically opposing spot welds be made until such time as no further movement or rotation is seen.

Figure 6D:
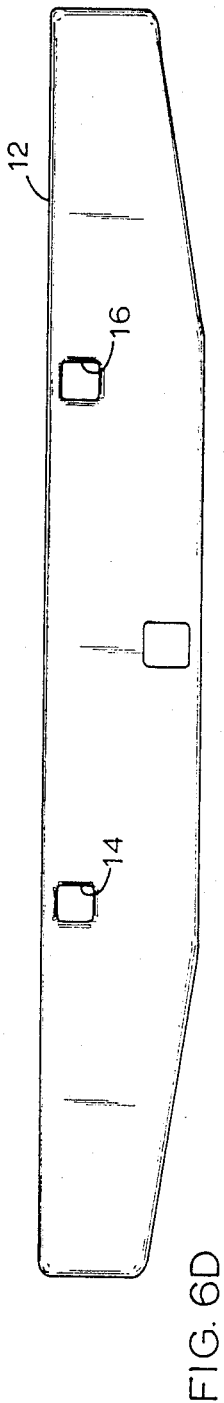

Turning to FIG. 6D, welding has been completed along the length of the inclined and vertical segments that form the end regions of bumper 12, and welding has been completed around the entire square perimeter of receivers 14, 16 to join them to first and second planer expanses 12a, 12b of bumper 12. It will be appreciated that, while not shown in FIGS. 6A through 6D, swaged receiver 18 similarly may be joined to first and second expanses 12a, 12b of bumper 12 to secure receiver 18 in proper alignment and position relative thereto. Of course, the (normal) alignment of a single receiver is much less critical than the (normal and parallel) alignment of dual, laterally spaced receivers, as it is relatively straightforward to fit a single male member into a corresponding female member. It is preferable that the weld joints used to join extensions 52a, 52b to first and second expanses 12a, 12b be through welds of approximately 0.187" depth, thereby to produce a strong weld joint and, by the preferred method, gusset-type weld beads are formed along the perimeter of receivers 14, 16 where they are joined to second expanse 12b (refer to FIGS. 2 and 3). Finally in reference to FIG. 6D, it is noted that, in accordance with the preferred method of manufacturing bumper/receiver apparatus 10, the tubular material edges adjacent the weld joints may be slightly rounded, after welding is completed, to conform them with the overall appearance of the rectangular tubular material and the edges may be deburred to give a finished, aesthetically pleasing appearance to bumper/receiver apparatus 10.

Those of skill will appreciate that, after the fashion of the preferred method of manufacturing the bumper/receiver apparatus, dual stinger vehicular accessories can be manufactured so that their stingers are properly positioned and aligned for the interchangeable mating with bumper/receiver apparatus. A second jig equipped with dual, laterally spaced female members mounted to a work surface can be used to align the stingers of a vehicular accessory being manufactured, thereby to immobilize the dual stingers relative to the vehicular accessory in proper position and alignment for their welded joinder. The skilled also will appreciate that the method of manufacturing bumper/receiver apparatus 10 and the variety of dual stinger accessories that it can accommodate can be at least semiautomated by the use in a known manner of microcontrolled or numerically controlled (NC) laser- or plasma burner-equipped robots and work tables, so long as the necessarily tight angular and dimensional tolerances are maintained.

Figure 7:
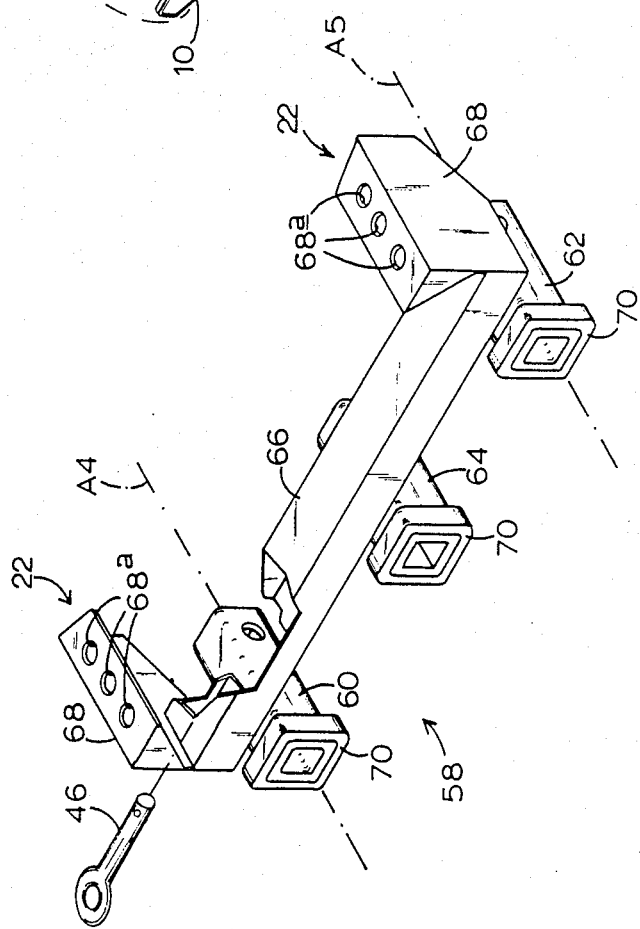
FIG. 7 is an isometric view of a modification to the preferred embodiment of the invention in which plural, spaced receivers are joined by a crossmember that may be bumper or frame-mounted to a vehicle.

Turning now to FIG. 7, a modification to the preferred embodiment of the invention is shown. Receiver apparatus 58 comprises three laterally spaced, elongate receivers 60, 62, 64 rigidly joined in substantially parallel alignment with one another transverse to, and beneath, a crossmember 66 having mounted on either end mounting means 22 comprising dual "mirror image", laterally spaced brackets 68 having plural holes 68a formed therein for the welded or hardware mounting of receiver apparatus 58 to the frame of a vehicle. Receivers 60, 62, 64 may be formed from "telescopic" tubing identical to that used in forming receivers 14, 16, 18 of the preferred embodiment and may be provided adjacent their outward end (away from the vehicle) with reinforcement members 70. It will be appreciated that members 70 are not required in the preferred embodiment of the invention due to the integral, flush-mounted, welded joinder of receivers 14, 16, 18 to bumper 12. Receivers 60, 62, 64 are identically dimensioned and each has a hole pair (only one of which is visible in FIG. 7) formed in opposite side walls near the free, inward end thereof (toward the vehicle), thus providing, in cooperation with a vehicular accessory and one or more cinch pins, e.g. cinch pin 46, securement means 48 identical to that of the preferred embodiment. Center receiver 64 is swaged to remove material from the corner of the rounded-corner tubing, as in the preferred embodiment. Thus, each of receivers 60, 62, 64 forms a channel of generally square cross section.

Importantly, the central, longitudinal axes A4, A5 of receivers 60, 62 are parallel with one another and are laterally spaced 26.536" center-to-center. This spacing corresponds with the spacing between receivers 14, 16 of the preferred embodiment, and enables receiver apparatus 58 to accommodate interchangeably any vehicular accessory that is made to be installed in the bumper receiver apparatus of the preferred embodiment. Persons skilled in the art will appreciate that a male jig similar to that described in reference to FIGS. 6A through 6D may be used in the manufacture of receiver apparatus 58 to ensure the proper position and alignment of receivers 60, 62 relative to crossmember 66 during their welded joinder.

Figure 8:
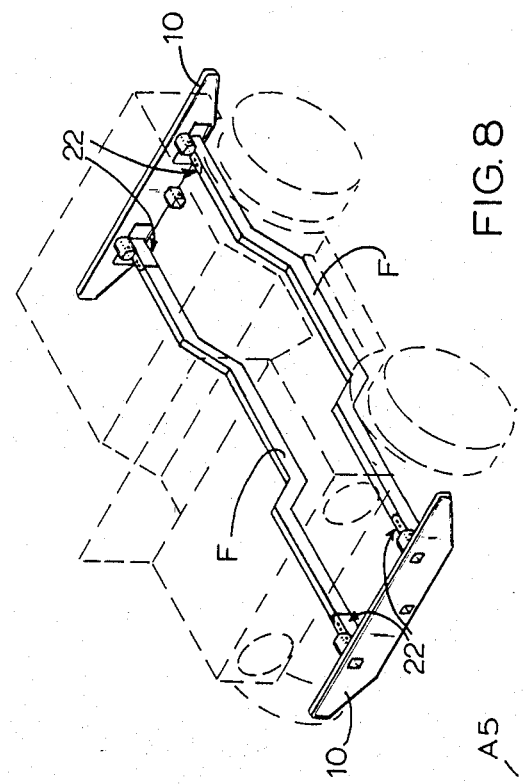
FIG. 8 is an isometric view of the apparatus, in their preferred embodiment, mounted to the front and rear frames of a vehicle.

Turning finally to FIG. 8, a vehicle mounting, at front and rear frame members F, a pair of bumper/receiver apparatus 10 is shown. FIG. 8 illustrates one of the many advantages of the integral bumper/receiver apparatus of the preferred embodiment of the invention. When mounted on both the front and rear frame of a vehicle, apparatus 10 provides universal adaptability of the apparatus-equipped vehicle to mount a variety of vehicular accessories. For example, a grill guard/winch assembly such as that shown at 32 in FIGS. 4 and 5 straightforwardly may be installed in either the front or rear bumper/receiver apparatus of the vehicle shown in FIG. 8 and may be moved from one to the other in a moment's time.

Thus, the owner of a vehicle equipped with front and rear bumper/receiver apparatus can invest in a single grill guard/winch assembly and yet will be as secure as the owner of a vehicle having both a front and a rear winch: Because the grill guard/winch assembly can be readily moved from the front to the rear of the vehicle (or vice versa), it may be operated to winch the vehicle either forward or backward, depending upon the particular requirement. Equally importantly, two or more vehicles that are each equipped with at least one bumper/receiver apparatus interchangeably may use a single vehicular accessory made to be mounted thereby. For example, a vehicle that is equipped with at least one bumper/receiver apparatus, but which is not equipped with a winch, nevertheless may be winched out of trouble by a passing motorist driving a vehicle that is similarly equipped but that also has the illustrated grill guard/winch assembly 32. The removal and reinstallation of a vehicular accessory from the front to the rear of a vehicle (or visa versa), or from one vehicle to another, takes only the few seconds required to uncinch the accessory; slide it out of the donor receiver apparatus; slide it into the donee receiver apparatus; and cinch it—without special skills, tools or hardware.

Accordingly, while a preferred embodiment of, and a preferred method of manufacturing, the invention have been described herein, as well as a proposed modification to the preferred embodiment of the invention, it is appreciated that further modifications are possible that come within the scope of the invention.

It is claimed and desired to secure by letters patent:

1. For mounting an accessory having an elongate mounting projection, a vehicle frame-mountable bumper/receiver apparatus comprising:
    a bumper having spaced first and second generally planar expanses at least partly bounding a void region therebetween;
    an elongate receiver rigidly joined with said bumper and extending within said void between said first and second expanses and projecting outwardly from said second expanse, said receiver forming an elongate channel cross-sectionally dimensioned to receive therein an elongate mounting projection of an accessory, said channel having an open end in the plane of said first expanse; and
    mounting means for mounting said bumper to the frame of a vehicle.

2. For mounting an accessory having an elongate mounting projection, a vehicle frame-mountable bumper/receiver apparatus comprising;
    a hollow bumper of predefined thickness, said bumper having rigid walls enclosing a substantially hollow space, said walls including substantially parallel planar first and second expanses;
    plural spaced elongate receivers rigidly joined with said bumper, said receivers having longitudinal axes that are substantially parallel with one another and substantially normal to said planar expanses and extending therebetween and projecting outwardly from said second expanse, each of said receivers forming a channel cross-sectionally dimensioned to receive therein an elongate mounting projection of an accessory and having a lengthwise dimension substantially greater than said predefined thickness of said bumper;
    mounting means for mounting said bumper to the frame of a vehicle; and
    securement means associated with said receivers for detachably securing an accessory to such vehicle, wherein each elongate mounting projection is detachably securable within one of said receivers.

3. For detachably mounting an accessory having a pair of laterally spaced elongate mounting projections, a vehicle frame-mountable bumper/receiver apparatus comprising:
    at least two elongate receivers having longitudinal axes;
    each of said receivers being rigidly joined with a bumper having a first generally planar expanse and a predefined thickness, said receivers extending inwardly from said first expanse in a generally horizontal plane with said longitudinal axes of said receivers being substantially parallel with one another, each of said receivers forming a channel extending from said first expanse of said bumper to an opposite terminal edge of said receiver, each of said channels having a lengthwise dimension substantially greater than said predefined thickness of said bumper, each of said channels being configured to receive therein an elongate mounting projection of an accessory; and
    mounting means for mounting said bumper to the frame of a vehicle.

* * * * *